(12) United States Patent
Dahms et al.

(10) Patent No.: US 10,941,549 B2
(45) Date of Patent: Mar. 9, 2021

(54) SINK UNIT ARRANGEMENT, GALLEY COMPARTMENT AND GALLEY

(71) Applicant: Airbus Operations GmbH, Hamburg (DE)

(72) Inventors: Tobias Dahms, Hamburg (DE); Peter Bielik, Hamburg (DE); Roland Lange, Nottensdorf (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 74 days.

(21) Appl. No.: 15/923,819

(22) Filed: Mar. 16, 2018

(65) Prior Publication Data

US 2018/0274216 A1    Sep. 27, 2018

(30) Foreign Application Priority Data

Mar. 27, 2017 (DE) .......................... 102017205136.1

(51) Int. Cl.
*E03C 1/182* (2006.01)
*B64D 11/04* (2006.01)
*B64D 13/08* (2006.01)
*B64D 11/00* (2006.01)
*B64D 13/06* (2006.01)

(52) U.S. Cl.
CPC .......... *E03C 1/182* (2013.01); *B64D 11/0007* (2013.01); *B64D 11/04* (2013.01); *B64D 13/08* (2013.01); *B64D 2013/0629* (2013.01)

(58) Field of Classification Search
CPC ............ B64D 11/04; B64D 2013/0629; B64D 11/0007; B64D 13/08; E03C 1/181; E03C 1/182; A47L 17/02
See application file for complete search history.

(56) References Cited

U.S. PATENT DOCUMENTS

| 3,126,552 | A | * | 3/1964 | Scharmer | ................ E03C 1/182 |
| | | | | | 4/633 |
| D215,170 | S | * | 9/1969 | Bachand | ........................ D32/55 |
| 4,813,087 | A | * | 3/1989 | Sperka | .................. B65F 1/1431 |
| | | | | | 4/629 |
| 7,780,114 | B2 | | 8/2010 | Doebertin et al. | |
| 2008/0001031 | A1 | | 1/2008 | Doebertin et al. | |

(Continued)

FOREIGN PATENT DOCUMENTS

| DE | 19618376 | 1/1998 |
| DE | 29807541 | 7/1998 |

(Continued)

OTHER PUBLICATIONS

German Search Report, dated Feb. 9, 2018, priority document.
European Search Report.

*Primary Examiner* — Janie M Loeppke
(74) *Attorney, Agent, or Firm* — Greer, Burns & Crain, Ltd.

(57) ABSTRACT

A sink unit arrangement for a galley provided for installation in a transport vehicle comprises a worktop and a drip tray, which is arranged in an installation opening provided in the worktop and comprises a first section and a second section. The second section has a depth which is greater than a depth of the first section and protrudes through the installation opening provided in the worktop into a free space adjacent to the installation opening.

15 Claims, 4 Drawing Sheets

(56) References Cited

U.S. PATENT DOCUMENTS

| | | |
|---|---|---|
| 2013/0299011 A1 | 11/2013 | Maier-Witt et al. |
| 2014/0102553 A1 | 4/2014 | Burd |
| 2016/0264246 A1 | 9/2016 | Young et al. |
| 2017/0009438 A1 | 1/2017 | Stachowski et al. |
| 2017/0050733 A1* | 2/2017 | Miron .................... B64D 11/04 |
| 2017/0320577 A1 | 11/2017 | Lutzer et al. |
| 2017/0349289 A1 | 12/2017 | Sieben |

FOREIGN PATENT DOCUMENTS

| | | |
|---|---|---|
| DE | 102006023047 | 11/2007 |
| DE | 102006023047 A1 | 11/2007 |
| DE | 102010053982 | 6/2012 |
| DE | 102015102885 | 9/2016 |
| DE | 102015210268 | 12/2016 |
| DE | 102015210269 | 12/2016 |
| DE | 102015210271 | 12/2016 |
| WO | 2016193366 | 12/2016 |
| WO | 2016193372 | 12/2016 |
| WO | 2016193378 | 12/2016 |

\* cited by examiner

US 10,941,549 B2

SINK UNIT ARRANGEMENT, GALLEY COMPARTMENT AND GALLEY

CROSS-REFERENCES TO RELATED APPLICATIONS

This application claims the benefit of the German patent application No. 10 2017 205 136.1 filed on Mar. 27, 2017, the entire disclosures of which are incorporated herein by way of reference.

BACKGROUND OF THE INVENTION

The invention relates to a sink unit arrangement for a galley provided for installation in a transport means, in particular an aircraft. The invention further relates to a galley compartment equipped with such a sink unit arrangement and a galley equipped with such a sink unit arrangement and/or such a galley compartment.

Modern airliners are normally equipped with onboard kitchens, so-called galleys, known, for example, from DE 10 2006 023 047 B4 or U.S. Pat. No. 7,780,114 B2. The galleys are usually installed in the doorway areas of the aircraft cabin and have a carcass with a base structure delimited by a worktop and top compartments arranged above the worktop. Kitchen appliances such as e.g., coffee machines, kettles, ovens etc. as well as drinks and food are normally accommodated in the top compartments of the galley. In the base structure of the galley, on the other hand, a trolley compartment is arranged to take up mobile trolleys, which are laden with objects, such as, e.g., drinks and food, provided for dispensing to the passengers on board the aircraft.

In the worktop area of a galley, a sink unit arrangement is normally provided, which is connected to a wastewater system of the aircraft. A drip tray of the sink unit arrangement must have a capacity that is great enough to enable the flight attendants to pour left-over drinks or other liquids into the drip tray quickly and without the drip tray overflowing and thus dispose of these into the wastewater system of the aircraft. To facilitate an integration of a drip tray with sufficient capacity, i.e., a sufficiently large liquid take-up capacity, into the worktop of the galley, a drip tray currently installed in aircraft galleys is constructed flat, thus has a small depth. In contrast to this, the drip tray has a large access surface and thus large dimensions in a width direction as well as a length direction. The drip tray accordingly has a large installation space requirement in the area of the worktop and the worktop surface.

Another known drip tray, which has an increased depth, protrudes upwards above a surface of the galley worktop in its installed state in a galley. The sink can then have a smaller width and/or a smaller length to realize the desired liquid take-up capacity. However, the top compartments of the galley must then be arranged correspondingly higher above the worktop in order to be able to install a tap, for example, at a desired height above the drip tray.

A galley is known from DE 10 2015 210 268 A1 and WO 2016/193378 A1, DE 10 2015 210 271 A1 and WO 2016/193366 A1 and DE 10 2015 269 A1 and WO 2016/193372 A1 respectively, in which a cooling fluid duct is integrated into a worktop forming an upper boundary of a trolley compartment, which duct is connectable via a cooling fluid opening to the interior of the trolley compartment. A cooling device for providing a cooling fluid to be supplied to the interior of the trolley compartment via the cooling fluid duct and the cooling fluid opening is integrated into an intermediate wall, which divides the trolley compartment of the galley into a first and a second section, or is arranged in the region of a side wall of the trolley compartment.

SUMMARY OF THE INVENTION

An object of the invention is to specify a sink unit arrangement for a galley provided for installation in a transport means, in particular an aircraft, which arrangement has adequate capacity for taking up liquids to be supplied to a wastewater system of the transport means, but is formed in a particularly space-saving manner in the region of a worktop of the galley. An object of the invention is furthermore to provide a galley compartment equipped with such a sink unit arrangement and a galley equipped with such a sink unit arrangement and/or such a galley compartment.

A sink unit arrangement for a galley provided for installation in a transport means comprises a worktop. When the sink unit arrangement is installed in the galley, an upper side of the worktop can be used as a work surface. Furthermore, the sink unit arrangement comprises a drip tray, which is arranged in an installation opening provided in the worktop. The shape of the installation opening formed in the worktop is preferably adapted to the shape of the drip tray of the sink unit arrangement, so that the drip tray can be inserted substantially gap-free into the installation opening formed in the worktop.

The drip tray comprises a first section and a second section. The second section has a depth that is greater than a depth of the first section. Furthermore, the second section protrudes through the installation opening provided in the worktop into a free space provided adjacent to the installation opening. In other words, in the sink unit arrangement, the second section of the drip tray has a depth that is not only greater than a depth of the first section, but is also greater than a depth of the worktop in the region of the second section of the drip tray, so that the second section of the drip tray protrudes through the worktop through the installation opening provided in the worktop. If the sink unit arrangement is installed in a galley, the free space provided to take up at least a part of the second section of the drip tray is located under the worktop, i.e., adjacent to the underside of the worktop facing away from the work surface of the worktop.

Due to the configuration of the drip tray with a section with an increased depth, the drip tray gains a sufficiently great liquid take-up capacity. Nevertheless, the installation space requirement of the drip tray in the region of the worktop is small, as a portion of the volume of the drip tray is taken up in the free space adjacent to the installation opening formed in the worktop.

In a preferred embodiment, the sink unit arrangement further comprises an outflow for the removal from the drip tray of liquids poured into the drip tray. The outflow is preferably connected to the second section of the drip tray. The outflow can then likewise be advantageously installed in the free space adjacent to the installation opening formed in the worktop.

The sink unit arrangement can further comprise a drain valve connected to the outflow. The drain valve can be configured to connect, in its open state, the outflow and thus the drip tray to a wastewater system, preferably a wastewater system under a reduced pressure such as installed in transport means, for example, such as in aircraft, for example. The drain valve can be a valve, for example, which is closed in an inactive state and thus separates the outflow from the wastewater system, i.e., in particular from the vacuum prevailing in the wastewater system. If a predetermined water column acts on the valve, the valve can be activated and opened, on the other hand, in order to connect the outflow to the wastewater system. Due to the vacuum prevailing in the wastewater system, the liquid standing in the outflow is then sucked into the wastewater system. The drain valve can further be equipped with an emergency opening system, which facilitates opening of the valve even in the event of a malfunction of the drain valve. The emergency opening system of the drain valve can comprise a manually actuatable cable pull, for example.

The sink unit arrangement preferably further comprises a particle filter, which serves to prevent the entry of particles into the wastewater system and, in particular, into the drain valve connected to the outflow. In the operation of the sink unit arrangement, proper functioning of the particle filter is particularly important, as particles, such as food residues or the like, for example, which are drained from the drip tray via the outflow, can cause blockages and/or damage to the drain valve. The particle filter is preferably arranged in the outflow in such a way adjacent to the second section of the drip tray that the particle filter is accessible via the second section of the drip tray. The particle filter can then be serviced particularly easily and exchanged if necessary.

In a preferred embodiment, the sink unit arrangement further comprises a drainage grille, which at least partially covers an access surface of the drip tray. The drainage grille preferably extends over the entire access surface of the drip tray. Liquids can be introduced into the drip tray without any problem through the drainage grille. At the same time, an upper side of the drainage grille facing away from the drip tray can advantageously be used as an additional work surface and/or for standing objects on, such as coffee pots or similar, for example.

The drainage grille can have a first section, which covers an access surface of the first section of the drip tray. The drainage grille can further have a second section, which covers an access surface of the second section of the drip tray. The first and the second section of the drip tray can be formed in one piece. Alternatively to this, however, it is also conceivable to execute the drainage grille in two parts, wherein the first and the second section of the drainage grille can be formed completely independently of one another or can be connected detachably to one another.

The drainage grille is preferably attached detachably or swivelably to the drip tray, at least in the region of its second section. The drainage grille can then be detached from the second section of the drip tray or swiveled into a position in which it frees the second section of the drip tray. Unobstructed access to the particle filter is facilitated thereby. However, the drainage grille is preferably attached detachably or swivelably to the drip tray also in the region of its first section, in order to make the first section of the drip tray accessible if required, for example for cleaning purposes.

In its first section the drainage grille can be provided with first grille openings that have a greater cross section than second grille openings provided in the second section of the drainage grille. The formation of the second section of the drainage grille with smaller grille openings prevents liquids that contain excessively large or too many particles from being poured into the second section of the drip tray and being able to cause blockages of the particle filter there. In contrast to this, larger particles, which are introduced into the first section of the drip tray, do not get directly into the outflow. On the contrary, it is possible, by removing the drainage grille, to clean the first section of the drip tray of these particles before they get into the outflow.

In a preferred embodiment of the sink unit arrangement, the drip tray is designed and arranged in such a way relative to the worktop that an access surface of the drip tray is substantially aligned with an upper side of the worktop forming a work surface. Furthermore, the drainage grille is preferably designed and arranged in such a way relative to the worktop that a drainage surface of the drainage grille is substantially aligned with an upper side of the worktop forming a work surface. When the sink unit arrangement is installed in a galley, sufficient free space is created in a galley region above the drip tray by such a configuration of the sink unit arrangement so that a tap can be installed there at a desired height, for example, without the top compartments of the galley having to be shifted upwards.

The dimensions, i.e., in particular the width and the length of the second section of the drip tray, are preferably adapted to the dimensions, i.e., in particular, the width and the length of the free space provided to take up at least a portion of the second section of the drip tray adjacent to the installation opening provided in the worktop. The first section of the drip tray can have a width that is greater than a width of the second section of the drip tray. In addition or alternatively to this, the first section of the drip tray can have a length that is greater than a length of the second section of the drip tray. Liquids can thereby be introduced more easily into the first section of the drip tray. Nevertheless, the dimensions of the first section of the drip tray are preferably kept as small as possible in order to minimize the installation space requirement of the drip tray in the region of the worktop.

The depth of the first section of the drip tray is preferably smaller than a depth of the worktop in the region of the first section of the drip tray. The first section of the drip tray can thereby be integrated fully into the worktop. Additional installation space adjacent to an underside of the worktop is then no longer required.

A galley compartment for a galley provided for installation in a transport means comprises an access opening on the front side and a rear wall opposite the access opening. Moreover, the galley compartment comprises a sink unit arrangement described above. The sink unit arrangement is preferably installed in the galley compartment in such a way that the worktop of the sink unit arrangement forms an upper boundary of the galley compartment, so that an upper side of the worktop can be used as a work surface. An interior of the galley compartment can be delimited upwards, on the other hand, by an underside of the worktop.

An installation space is located underneath the worktop. The second section of the drip tray of the sink unit arrangement protrudes into this installation space provided underneath the worktop. In the galley compartment, the installation space is consequently used to take up at least a portion of the second section of the drip tray of the sink unit arrangement.

The galley compartment can be a trolley compartment, for example, in which a mobile half size trolley can be accommodated. The mobile trolley, which can be laden with drinks, food or other objects provided for dispensing to the passengers on the transport means, for example, can be pushed into the galley compartment or moved out of the galley compartment through the front access opening. The installation space, which is used to take up at least a portion of the second section of the drip tray of the sink unit arrangement, is then preferably located in an area of the galley compartment adjacent to the rear wall of the galley compartment.

Alternatively or in addition to this, the galley compartment can comprise a system compartment and the installation space can be provided in the system compartment. A cooling device can be arranged in the installation space, which serves to cool the galley compartment and/or other areas of a galley equipped with the galley compartment. The cooling device can be executed, for example, in the form of a self-sufficient air chiller. Alternatively to this, however, the cooling device can also be connectable to a central cooling system of the transport means and comprise a heat exchanger, for example, through which a cooling fluid flows and in which air is cooled to a desired low temperature before being supplied to the galley compartment or other areas of a galley equipped with the galley compartment.

The cooling device is preferably arranged in the installation space adjacent to the front access opening of the galley compartment. Sufficient space then exists in an area of the installation space adjacent to the rear wall of the galley compartment for accommodating the portion of the second section of the drip tray protruding into the installation space, the outflow, the drain valve and the connection line for connection of the sink unit arrangement to the wastewater system of the transport means.

The installation space can be arranged adjacent to a side wall or an intermediate wall of the galley compartment. However, the installation space is preferably integrated in a particularly space-saving manner into a side wall or an intermediate wall of the galley compartment. An installation of the installation space in a side wall or adjacent to a side wall of the galley compartment suggests itself, in particular, if the galley compartment has smaller dimensions. An installation of the installation space, in an intermediate wall or adjacent to an intermediate wall of the galley compartment, is advantageous, on the other hand, if the galley compartment is a galley compartment of larger dimensions.

At least one cooling fluid duct can be integrated into the worktop of the sink unit arrangement. This is made possible by the small installation space requirement of the drip tray of the sink unit arrangement. The integration of the cooling fluid duct into the worktop of the sink unit arrangement can be realized as described in DE 10 2015 210 268 A1 and WO 2016/193378 A1, DE 10 2015 210 271 A1 and WO 2016/193366 A1 and DE 10 2015 269 A1 and WO 2016/193372 A1.

A galley provided for installation in a transport means comprises a sink unit arrangement described above and/or a galley compartment described above.

A sink unit arrangement described above, a galley compartment described above and/or a galley described above is/are especially advantageous for use in an aircraft.

BRIEF DESCRIPTION OF THE DRAWINGS

A preferred embodiment of the invention is now explained in greater detail with reference to the enclosed schematic drawings, of which

DETAILED DESCRIPTION OF THE PREFERRED EMBODIMENTS

Figure 2:
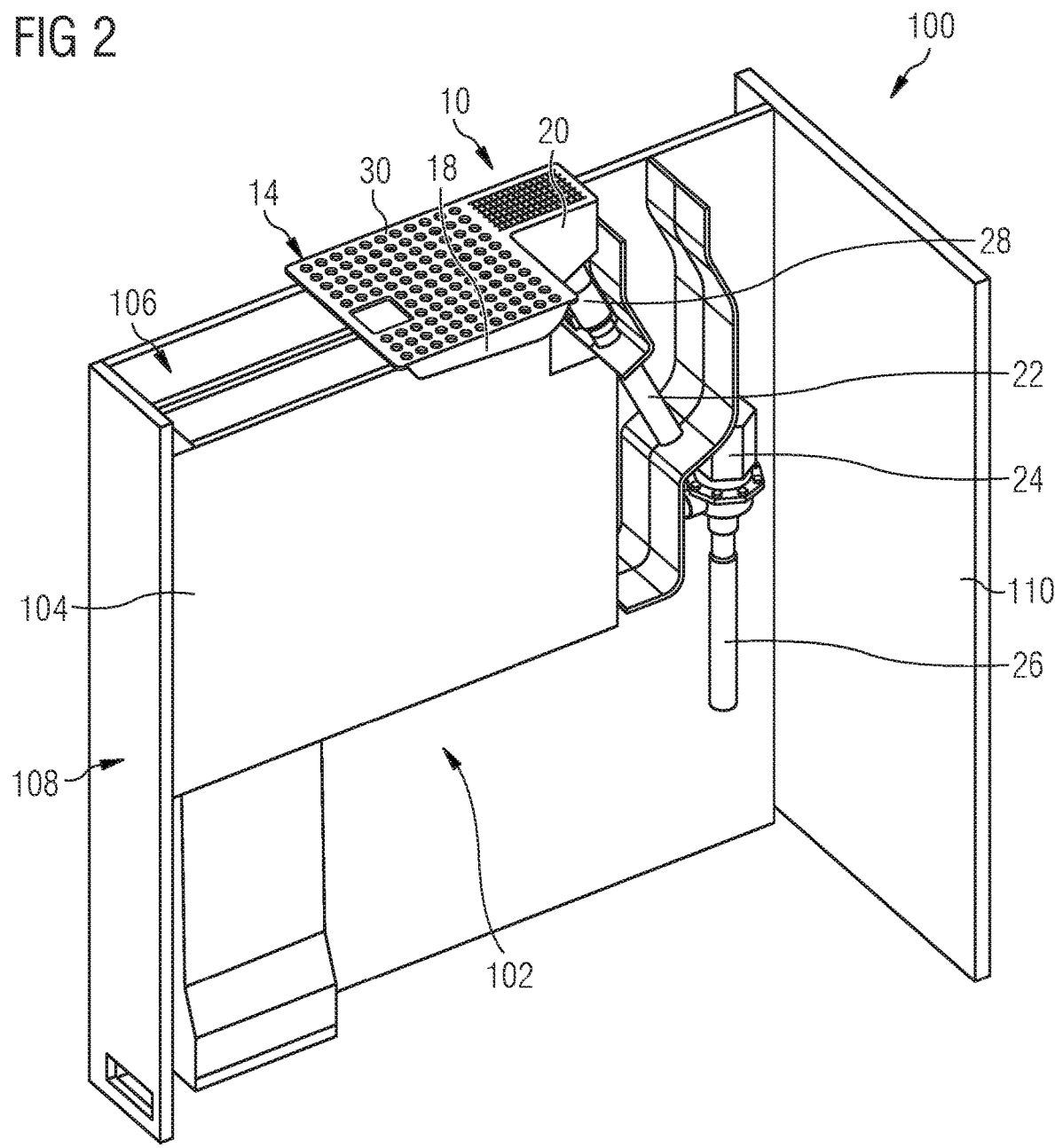
FIG. 2 shows a three-dimensional view of a galley compartment, in which a sink unit arrangement according to FIG. 1 is installed.
Figure 3:
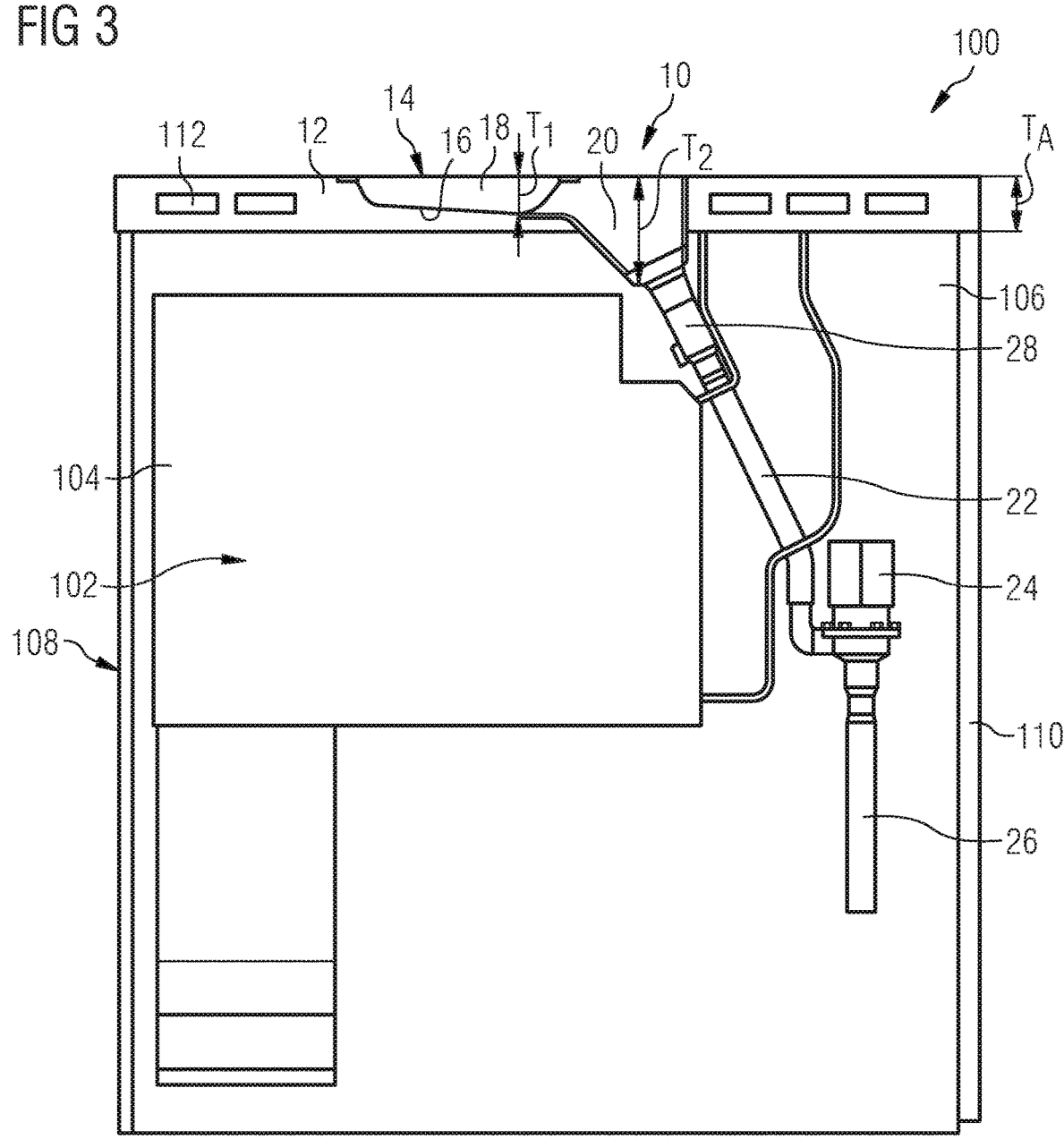
FIG. 3 shows a cross-sectional view of the galley compartment according to FIG. 2
Figure 4:
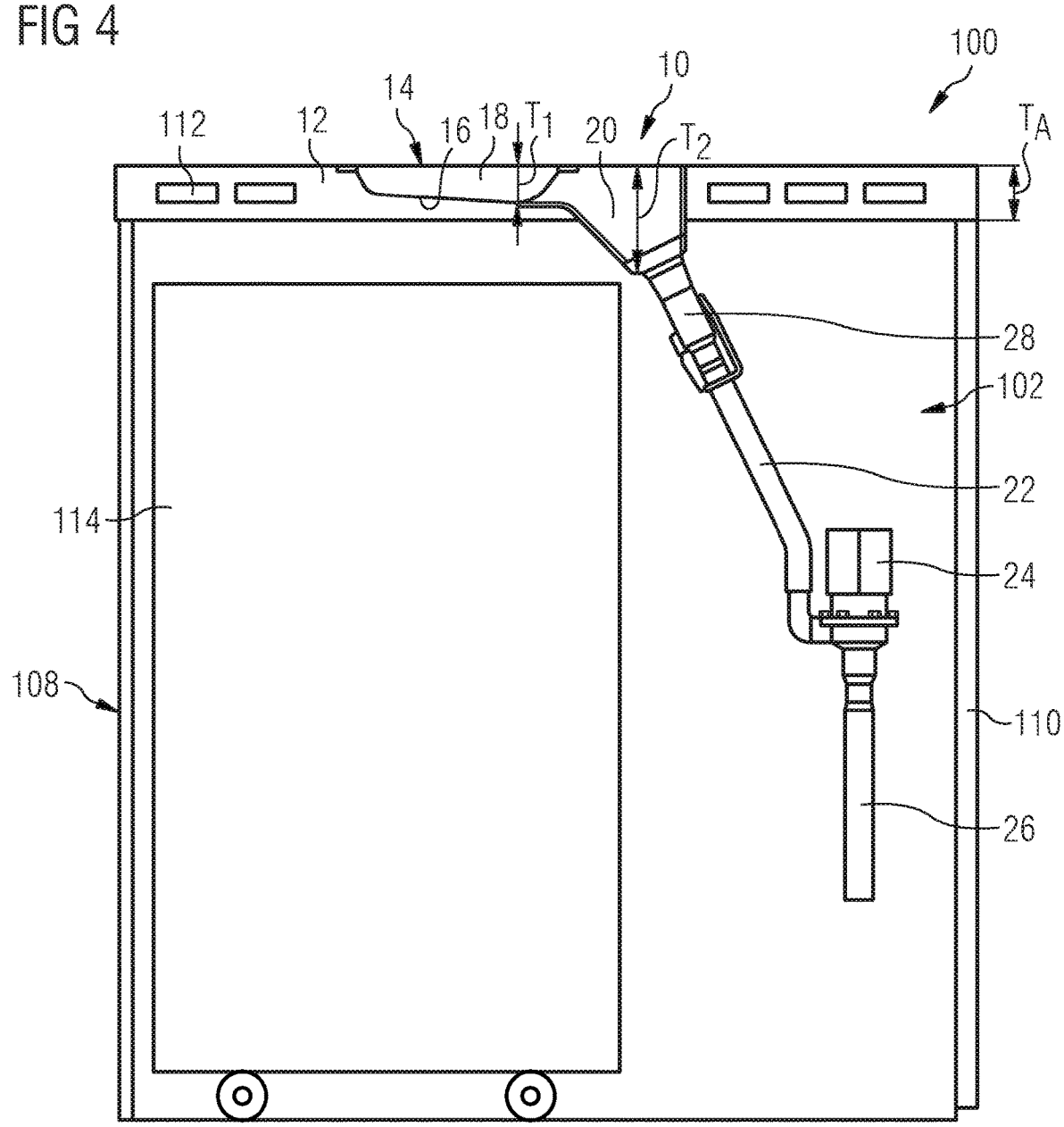
FIG. 4 shows a cross-sectional view of an alternative galley compartment.

A sink unit arrangement 10 illustrated in the figures, which is suitable, in particular, for installation in a galley of an airliner, comprises a worktop 12 (see FIGS. 3 and 4). If the sink unit arrangement 10, as shown in FIGS. 2, 3 and 4, is installed in a galley compartment 100 of the aircraft galley, the worktop 12 of the sink unit arrangement 10 forms an upper boundary of the galley compartment 100, so that an upper side of the worktop 12 can be used as a work surface. An interior of the galley compartment 100 is delimited upwards, on the other hand, by an underside of the worktop 12.

The sink unit arrangement 10 further comprises a drip tray 14, which is arranged in an installation opening 16 provided in the worktop 12. The shape of the installation opening 16 formed in the worktop is adapted to the shape of the drip tray 14 of the sink unit arrangement in such a way that the drip tray 14 is inserted substantially gap-free into the installation opening 16 formed in the worktop 12.

Figure 1:
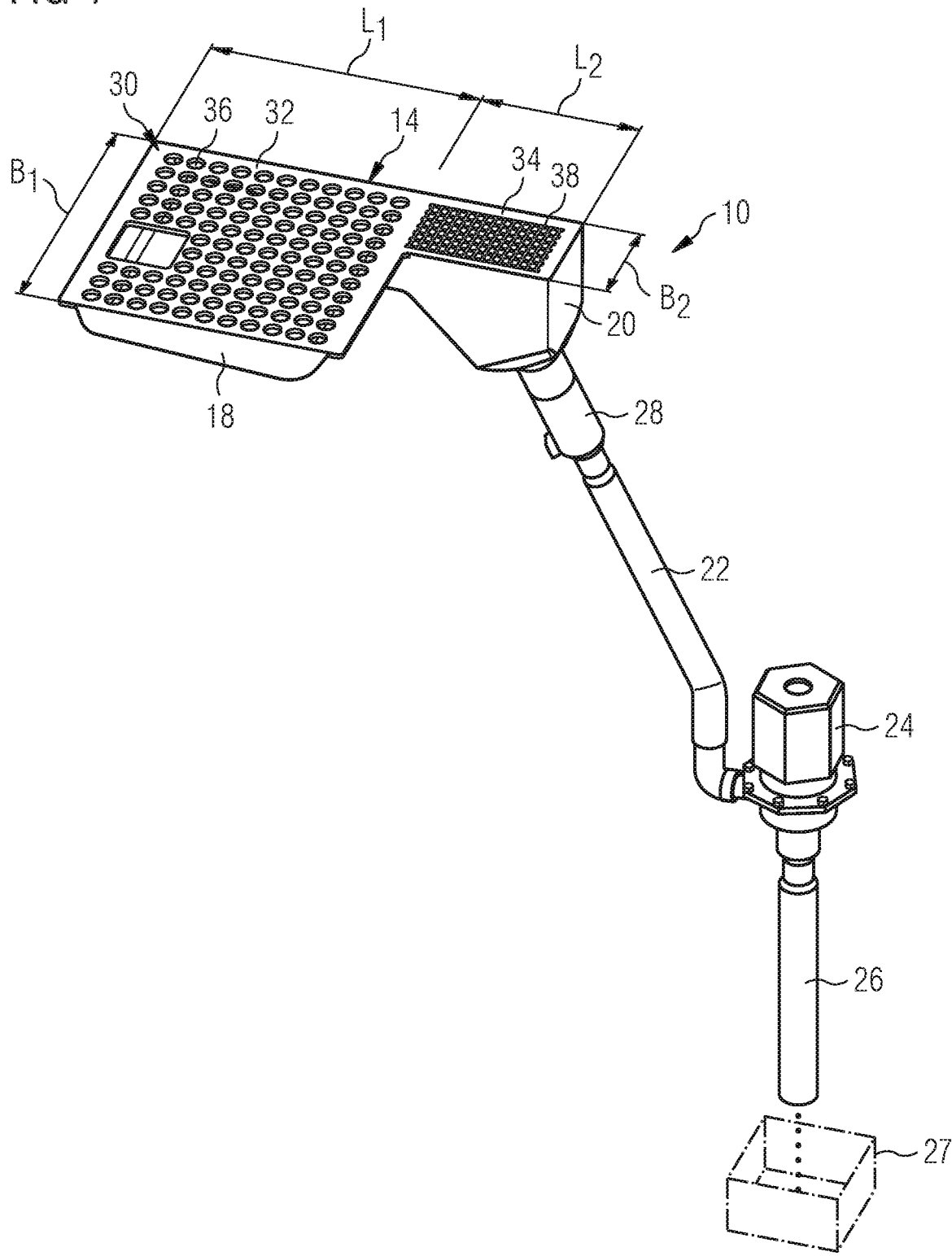
FIG. 1 shows a three-dimensional view of a sink unit arrangement.

As is most clearly discernible from FIGS. 1 and 3, the drip tray 14 comprises a first section 18 and a second section 20. The second section 20 of the drip tray 14 has a depth T2, which is greater than a depth T1 of the first section 18. Furthermore, the second section 20 protrudes through the installation opening 16 provided in the worktop 14 into a free space provided adjacent to the installation opening 16. An access surface of the drip tray 14 is aligned, on the other hand, with the upper side of the worktop 12 forming a work surface. Furthermore, the depth T1 of the first section 18 of the drip tray 14 is smaller than a depth TA of the worktop 12 in the region of the first section of the drip tray, so that the first section 18 of the drip tray 14 is integrated completely into the worktop 12.

The sink unit arrangement further comprises an outflow 22, which is connected at a first end to the second section 20 of the drip tray 14 and at a second end to a drain valve 24. In its open state the drain valve 24 connects the outflow 22 and thus the drip tray 14 via a line 26 to a wastewater system 27 of the aircraft that is permanently under a reduced pressure. In its inactive state the drain valve 24 is closed and separates the outflow 22 from the wastewater system 27, i.e., in particular, from the vacuum prevailing in the wastewater system 27. If a predetermined water column acts on the drain valve 24, the drain valve 24 is activated, on the other hand, and opened. The liquid standing in the outflow 22 is then sucked into the wastewater system 27 by the vacuum prevailing in the wastewater system 27.

Arranged in the outflow 22 adjacent to the second section 20 of the drip tray 14 is a particle filter 28, which serves to prevent the entry of particles into the wastewater system 27 and, in particular, into the drain valve 24. In particular, the particle filter 28 is inserted into the outflow 22 in such a way adjacent to the second section 20 of the drip tray 24 that the particle filter 28 is accessible via the second section 20 of the drip tray 14. The particle filter 28 can easily be serviced thereby and exchanged if necessary.

The sink unit arrangement 10 further comprises a drainage grille 30, which covers the access surface of the drip tray 14. A drainage surface of the drainage grille 30 formed by an upper side of the drainage grille 30 is aligned with the upper side of the worktop 12 forming a work surface. The drainage grille 30 has a first section 32, which covers an access surface of the first section 18 of the drip tray 14. Furthermore, the drainage grille 30 has a second section 34, which covers an access surface of the second section 20 of the drip tray 14. The first and the second section 32, 34 of the drainage grille 30 are formed in one piece. The drainage grille 30 is further attached to the drip tray 14 detachably or swivelably, so that the drip tray 14 is accessible unobstructedly if necessary, such as for cleaning purposes, for example, or to facilitate unobstructed access to the particle filter 28.

In its first section 32 the drainage grille 30 has first grille openings 36, which have a larger cross section than second grille openings 38 provided in the second section 34 of the drainage grille 30. The formation of the second section 34 of the drainage grille 30 with smaller grille openings 38 prevents liquids containing excessively large or too many particles from being poured into the second section 20 of the drip tray 14 and being able to cause blockages of the particle filter 28 there.

The free space for taking up a portion of the second section 20 of the drip tray 14 that protrudes via the underside of the worktop 12 from the installation opening 16 formed in the worktop 12 is formed by an area of an installation space 102 provided in the galley compartment 100 for a cooling device 104 in the installed state of the sink unit arrangement 10 in the galley compartment 100, which state is shown in FIGS. 2 and 3. In the galley compartment 100 the installation space 102 provided for taking up the cooling device 104 underneath the worktop 12 of the sink unit arrangement 10 is consequently used in addition to take up a portion of the second section 20 of the drip tray 14 of the sink unit arrangement 10.

In the galley compartment 100 illustrated in FIGS. 2 and 3, the installation space 102 for the cooling device 104 is arranged in a system compartment, which is integrated into an intermediate wall 106 of the galley compartment 100, which wall extends between a front access opening 108 and a rear wall 110 of the galley compartment 100 and divides the galley compartment 100 into two areas arranged adjacent to one another. Alternatively to this, however, the installation space 102 for the cooling device 104 in the galley compartment 100 can also be arranged in the area of a side wall of the galley compartment 100 not shown in the figures or can be integrated into the side wall of the galley compartment 100.

The cooling device 104 is arranged in the installation space 102 adjacent to the front access opening 108 of the galley compartment 100. Due to this, sufficient space exists in an area of the installation space 102 adjacent to the rear wall 110 of the galley compartment 100 to accommodate the portion of the second section 20 of the drip tray 14 protruding into the installation space 102, the outflow 22, the drain valve 24 and the connection line 26 for connecting the sink unit arrangement to the wastewater system 27 of the transport means.

The dimensions, i.e., the width B2 and the length L2 of the second section 20 of the drip tray 14 are adapted to the dimensions, i.e., the width and the length of the free space that is provided adjacent to the installation opening 16 provided in the worktop 12 for taking up a portion of the second section 20 of the drip tray 14. In particular, the width B2 of the second section 20 of the drip tray 14 is smaller than a width of the installation space 102 integrated into the intermediate wall 106 of the galley compartment 100 for the cooling device 104.

The first section 18 of the drip tray 14 has a width B1, on the other hand, which is greater than the width B2 of the second section 20 of the drip tray 14. Furthermore, the first section 18 of the drip tray 14 has a length L1, which is greater than a length L2 of the second section 20 of the drip tray 14. Liquids can thereby be introduced more easily into the first section 18 of the drip tray 14. Nevertheless, the dimensions of the first section 18 of the drip tray 14 are preferably kept as small as possible in order to minimize the installation space requirement of the drip tray 14 in the region of the worktop 12. It is thereby made possible, as illustrated schematically in FIG. 3, to integrate a cooling fluid duct 112 into the worktop 12 of the sink unit arrangement 10.

The galley compartment 100 shown in FIG. 4 is constructed in the form of a trolley compartment, in which a mobile half size trolley 144 can be accommodated. The mobile trolley 144, which can be laden with drinks, food or other objects provided for dispensing to the passengers on the transport means, for example, can be pushed into the galley compartment 100 or moved out of the galley compartment 100 through the front access opening 108. The installation space 102, which is used to take up a portion of the second section 20 of the drip tray 14 of the sink unit arrangement 10, is located in an area of the galley compartment 100 adjacent to the rear wall 110.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A sink unit arrangement for a galley provided for installation in a transport means, comprising:
   a worktop,
   a drip tray arranged in an installation opening provided in the worktop and comprising a first section and a second section, wherein the second section has a depth which is greater than a depth of the first section and protrudes through the installation opening provided in the worktop into a free space adjacent to the installation opening,
   a drainage grille at least partially covering an access surface of the drip tray, wherein the drainage grille comprises a first section covering an access surface of the first section of the drip tray and a second section covering an access opening of the second section of the drip tray, and
   wherein the depth of the first section of the drip tray is smaller than a thickness of the worktop in the region of the first section of the drip tray, and
   wherein an access surface of the drip tray is substantially aligned with an upper side of the worktop forming a work surface and wherein a drainage surface of the drainage grille is substantially aligned with the work surface of the worktop.

2. The sink unit arrangement according to claim 1, further comprising an outflow connected to the second section of the drip tray.

3. The sink unit arrangement according to claim 2, further comprising a drain valve, which is connected to the outflow and is configured to connect, in its open state, the outflow to a wastewater system under reduced pressure.

4. The sink unit arrangement according to claim 2, further comprising a particle filter, arranged in the outflow in such a way adjacent to the second section of the drip tray that the particle filter is accessible via the second section of the drip tray.

5. The sink unit arrangement according to claim 1, wherein the drainage grille is attached to the drip tray detachably or swivelably at least in the region of its second section.

6. The sink unit arrangement according to claim 1, wherein the drainage grille is provided in its first section with first grille openings which have a larger cross section than second grille openings provided in the second section of the drainage grille.

7. The sink unit arrangement according to claim 1, wherein the first section of the drip tray has a width, which is greater than a width of the second section of the drip tray.

8. The sink unit arrangement according to claim 1, wherein the first section of the drip tray has a length, which is greater than a length of the second section of the drip tray.

9. The sink unit arrangement according to claim 1, wherein the first section of the drip tray has a width, which is greater than a width of the second section of the drip tray and wherein the first section of the drip tray has a length, which is greater than a length of the second section of the drip tray.

10. A galley compartment for a galley provided for installation in a transport means, comprising:

a front access opening and a rear wall lying opposite the access opening, a sink unit arrangement according to claim 1, wherein the second section of the drip tray of the sink unit arrangement protrudes into an installation space provided in the galley compartment underneath the worktop of the sink unit arrangement.

11. The galley compartment according to claim 10, further comprising a cooling device, which is arranged in the installation space provided underneath the worktop of the sink unit arrangement, adjacent to the front access opening of the galley compartment.

12. The galley compartment according to claim 10, wherein the installation space is arranged in at least one of the region of a side wall of the galley compartment and the region of an intermediate wall dividing the galley compartment into a first area and a second area.

13. The galley compartment according to claim 10, wherein a least one cooling fluid duct is integrated into the worktop of the sink unit arrangement.

14. A galley for installation in a transport means, comprising a sink unit arrangement according to claim 1.

15. A galley for installation in a transport means, comprising a galley compartment according to claim 10.

* * * * *